No. 638,752. Patented Dec. 12, 1899.
E. A. PERKINS.
AXLE BOX.
(Application filed May 15, 1899.)

(No Model.)

Witnesses
W. L. Hudson
A. S. Gilbert

Inventor
Edward Alfred Perkins
By Henry N. Copp
Attorney

THE NORRIS PETERS CO., PHOTO-LITHO., WASHINGTON, D. C.

UNITED STATES PATENT OFFICE.

EDWARD ALFRIEND PERKINS, OF GORDON, GEORGIA.

AXLE-BOX.

SPECIFICATION forming part of Letters Patent No. 638,752, dated December 12, 1899.

Application filed May 15, 1899. Serial No. 716,829. (No model.)

*To all whom it may concern:*

Be it known that I, EDWARD ALFRIEND PERKINS, a citizen of the United States, residing at Gordon, in the county of Wilkinson and State of Georgia, have invented certain new and useful Improvements in Axle-Boxes; and I do hereby declare the following to be a full, clear, and exact description of the invention, such as will enable others skilled in the art to which it appertains to make and use the same.

My invention relates to axles and axle-boxes for vehicles, and has for its object the provision of certain improvements whereby the wear on the parts is minimized and equalized and the lubricant applied and retained in a novel manner and the bearing parts protected from dust and other foreign matter.

Having the foregoing and other objects in view, the invention consists of certain improved features and novel arrangements and adaptations of parts, as will appear more fully hereinafter.

Figure 1:
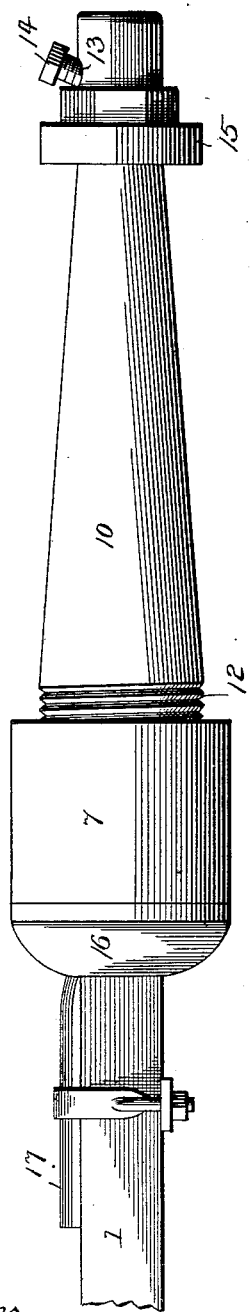
Figure 2:
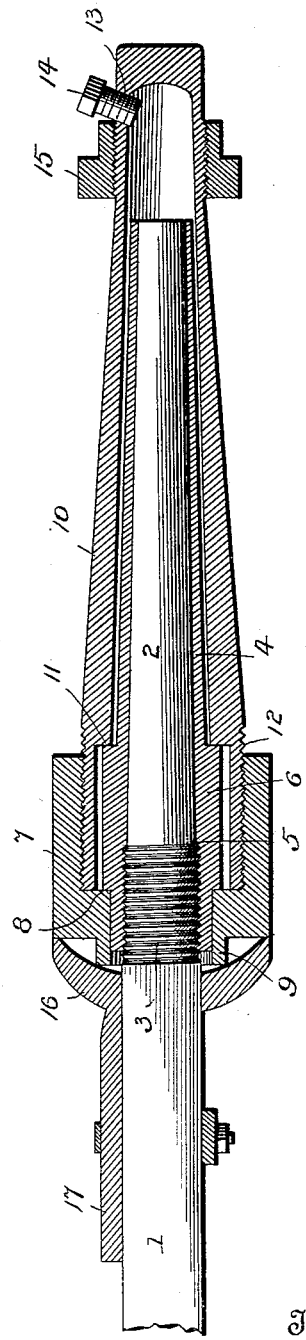

In the accompanying drawings, Figure 1 is a view in side elevation embodying my invention, and Fig. 2 is a longitudinal section thereof.

The axle 1 has a tapering spindle 2, provided with an enlarged screw-threaded portion 3 at its inner end. Over the spindle is fitted a tapering sleeve 4, whose inner end screws on the portion 3, and it is provided with an internal shoulder 5, which abuts the end of the said threaded portion. At the inner end of the sleeve is an enlarged portion 6.

The numeral 7 designates a coupling fitted loosely on the extreme inner end of the sleeve 4 and having a shoulder 8 abutting the inner end of said enlarged portion, thus preventing displacement of the coupling. Said coupling is provided with an integral nut-like portion 9 at its inner end, which affords a means for manipulating said coupling.

The numeral 10 represents the axle-box, the same being fitted in the hub of the wheel and of tapering form. It is adapted to turn on the sleeve 4 and is provided with an internal enlargement where it is fitted loosely over the enlarged portion 6 of the sleeve, thus providing the internal shoulder 11, which abuts the outer end of said enlarged portion and limits the inward longitudinal play of the box. The inner end of the box is provided with screw-threads 12, engaging similar internal screw-threads on the coupling. The outer end of the axle-box is closed, and it is provided with an oil-feed opening 13, through which the lubricant can be applied to the sleeve and interior of the box. This opening is closed by a removable screw-threaded plug 14. A nut 15, screwed on the outer end of the box, bears against the hub and holds it in position against the coupling.

The numeral 16 designates a cup-shaped sand-band, which houses the nut-like projection on the coupling and bears against the latter. It is fitted snugly on the axle and is provided with a flat integral arm 17, held firmly by the usual clip on the axle. This band can be made in separable halves instead of one piece, if preferred.

The outer end of the box being completely closed, it is rendered dust-proof and the lubricant can neither escape nor drip or become impregnated with foreign material. At the other end of the bearing the sand-band excludes the dust, and thus the parts are absolutely protected and smooth and easy running is insured.

Having thus described my invention, what I claim as new, and desire to secure by Letters Patent, is—

1. The combination with an axle having a screw-threaded portion, of a sleeve fitted over the axle and engaging said screw-threaded portion which is provided with an enlarged portion intermediate its ends, a coupling having a bearing on the inner end of the sleeve and provided with a shoulder abutting the inner end of the enlarged portion, a box, free to turn on the sleeve, which has its bore enlarged at its inner end which loosely receives the enlargement of the sleeve and providing a shoulder abutting the outer end of the enlarged portion aforesaid, said box having its inner end screwed into the coupling whereby longitudinal play of the box and coupling is prevented.

2. The combination with an axle, of a sleeve fitted thereover which is screwed onto the axle, a coupling having a bearing on the sleeve and held against displacement by the latter, and a box which receives the sleeve and is connected to the coupling, said box being closed at its outer end and having a feed-opening for introducing the lubricant to its interior and a closing device for said opening.

In testimony whereof I affix my signature in presence of two witnesses.

EDWARD ALFRIEND PERKINS.

Witnesses:
W. A. JONES,
W. W. LEE.